(12) United States Patent
Higuchi

(10) Patent No.: US 8,379,975 B2
(45) Date of Patent: Feb. 19, 2013

(54) IMAGE PROCESSING DEVICE AND METHOD, AND PROGRAM RECORDING MEDIUM

(75) Inventor: Keiji Higuchi, Kunitachi (JP)

(73) Assignee: Olympus Corporation, Tokyo (JP)

( * ) Notice: Subject to any disclaimer, the term of this patent is extended or adjusted under 35 U.S.C. 154(b) by 407 days.

(21) Appl. No.: 12/704,152

(22) Filed: Feb. 11, 2010

(65) Prior Publication Data

US 2010/0215266 A1    Aug. 26, 2010

(30) Foreign Application Priority Data

Feb. 17, 2009 (JP) ................................. 2009-034085

(51) Int. Cl.
*G06K 9/00* (2006.01)
*G06K 9/34* (2006.01)

(52) U.S. Cl. ..................................................... 382/167

(58) Field of Classification Search .................. 382/162, 382/164, 165, 167, 190, 199, 254, 255, 260–264, 382/266, 275, 294; 348/222.1, 230.1, 241, 348/243, 252, 272, 275, 277, 627; 358/1.1, 358/1.9, 3.26, 512, 514, 515, 518, 520–522; 375/240.27, 240.29
See application file for complete search history.

(56) References Cited

U.S. PATENT DOCUMENTS

| 6,738,510 | B2 * | 5/2004 | Tsuruoka et al. | 382/167 |
| 7,369,284 | B1 * | 5/2008 | Inuzuka et al. | 358/512 |
| 7,844,127 | B2 * | 11/2010 | Adams et al. | 382/266 |
| 7,856,150 | B2 * | 12/2010 | Li et al. | 382/260 |
| 8,120,679 | B2 * | 2/2012 | Ishiga | 348/252 |
| 2008/0266428 | A1 | 10/2008 | Egawa | |
| 2010/0215266 | A1 * | 8/2010 | Higuchi | 382/167 |

FOREIGN PATENT DOCUMENTS

| JP | 2001-307079 A | 11/2001 |
| JP | 2002-010274 A | 1/2002 |
| JP | 2005-318383 A | 11/2005 |
| JP | 2008-278243 A | 11/2008 |
| JP | 2008-278324 A | 11/2008 |

OTHER PUBLICATIONS

Japanese Office Action dated Dec. 4, 2012 issued in counterpart Japanese Application No. 2009-034085.

* cited by examiner

*Primary Examiner* — Amir Alavi

(74) *Attorney, Agent, or Firm* — Holtz, Holtz, Goodman & Chick, PC

(57) ABSTRACT

An image processing device includes a predominant color edge detection unit for detecting an edge using a predominant color signal which is a color signal with a highest appearance frequency from among plural color signals forming an input image signal, and a sub-color parameter calculation unit for calculating, with respect to a sub-color signal which is a color signal other than the predominant color signal in the plural color signals, from a pixel of interest and neighboring pixels of a same color as the pixel of interest, a sub-color parameter value related to a degree of isolated point of the pixel of interest. The image processing device further includes a sub-color isolated point correction unit for correcting the pixel of interest based on the sub-color parameter value and information of the detected edge.

16 Claims, 11 Drawing Sheets

FIG. 2

| R11 | G12 | R13 | G14 | R15 | R16 |
|-----|-----|-----|-----|-----|-----|
| G21 | B22 | G23 | B24 | G25 | G26 |
| R31 | G32 | R33 | G34 | R35 | R36 |
| G41 | B42 | G43 | B44 | G45 | G46 |
| R51 | G52 | R53 | G54 | R55 | R56 |

FIG. 3

| -1 |    | -1 |
|----|----|----|
|    | 4  |    |
| -1 |    | -1 |

FIG. 13

| G11 | G12 | G13 | G14 | G15 |
|-----|-----|-----|-----|-----|
| G21 | G22 | G23 | G24 | G25 |
| G31 | G32 | G33 | G34 | G35 |
| G41 | G42 | G43 | G44 | G45 |
| G51 | G52 | G53 | G54 | G55 |

FIG. 14

| R11 | B12 | R13 | B14 | R15 |
|-----|-----|-----|-----|-----|
| B21 | R22 | B23 | R24 | B25 |
| R31 | B32 | R33 | B34 | R35 |
| B41 | R42 | B43 | R44 | B45 |
| R51 | B52 | R53 | B54 | R55 |

FIG. 15

| -1 | -1 | -1 |
|----|----|----|
| -1 | 8  | -1 |
| -1 | -1 | -1 |

IMAGE PROCESSING DEVICE AND METHOD, AND PROGRAM RECORDING MEDIUM

BACKGROUND OF THE INVENTION

1. Field of the Invention

The present invention relates to an image processing device and method, and a program recording medium suited for performing correction of isolated points with respect to an input image signal.

This application is based on Japanese Patent Application No. 2009-034085, the content of which is incorporated herein by reference.

2. Description of Related Art

Conventionally, a method of detecting a defective pixel based on pixel information of the same color and correcting the same is proposed for a method of detecting defects in a video signal. For instance, Japanese Unexamined Patent Application, Publication No. 2001-307079 discloses a method of detecting a defect of a pixel of interest using neighboring pixels of the same color. Japanese Unexamined Patent Application, Publication No. 2002-10274 discloses a method of extracting a color component from three adjacent pixels, and detecting and correcting the defect from the extent of difference in the diagonal direction.

BRIEF SUMMARY OF THE INVENTION

The present invention adopts the following solutions.

A first aspect of the present invention relates to an image processing device for performing an image process on an input image signal consisting of a plurality of color signals including a color signal having a different appearance frequency from another color signal, the image processing device including an edge detection unit for detecting an edge using the input image signal or a predominant color signal which is a color signal with the highest appearance frequency; a sub-color parameter calculation unit for calculating, with respect to a sub-color signal or a color signal other than the predominant color signal, from a pixel of interest and neighboring pixels of the same color as the pixel of interest, a sub-color parameter value related to a degree of isolated point of the pixel of interest; and a sub-color isolated point correction unit for correcting the pixel of interest based on the sub-color parameter value calculated by the sub-color parameter calculation unit and the information of the edge detected by the edge detection unit.

A second aspect of the present invention relates to an image processing method for performing an image process on an input image signal consisting of a plurality of color signals including a color signal having a different appearance frequency from another color signal, the image processing method including an edge detection step of detecting an edge using the input image signal or a predominant color signal which is a color signal with the highest appearance frequency; a sub-color parameter calculation step of calculating, with respect to a sub-color signal or a color signal other than the predominant color signal, from a pixel of interest and neighboring pixels of the same color as the pixel of interest, a sub-color parameter value related to a degree of isolated point of the pixel of interest; and a sub-color isolated point correction step of correcting the pixel of interest based on the sub-color parameter value calculated in the sub-color parameter calculation step and the information of the edge detected in the edge detection step.

A third aspect of the present invention relates to an image processing program recording medium for performing an image process on an input image signal consisting of a plurality of color signals including a color signal having a different appearance frequency from another color signal, the program causing a computer to execute an edge detection process of detecting an edge using the input image signal or a predominant color signal which is a color signal with the highest appearance frequency; a sub-color parameter calculation process of calculating, with respect to a sub-color signal or a color signal other than the predominant color signal, from a pixel of interest and neighboring pixels of the same color as the pixel of interest, a sub-color parameter value related to a degree of isolated point of the pixel of interest; and a sub-color isolated point correction process of correcting the pixel of interest based on the sub-color parameter value calculated in the sub-color parameter calculation process and the information of the edge detected in the edge detection process.

A fourth aspect of the present invention relates to an imaging system including an imaging unit; and the image processing device for performing an image process on an image signal acquired by the imaging unit.

BRIEF DESCRIPTION OF THE SEVERAL VIEWS OF THE DRAWINGS

FIG. 2 is a view showing pixels of a Bayer array;

FIG. 3 is a view showing one example of a Laplacian filter of a diagonal direction;

FIG. 13 is a view showing a two-plate predominant color pixel array;

FIG. 14 is a view showing a two-plate sub-color pixel array; and

FIG. 15 is a view showing one example of a Laplacian filter to the left, right, top, bottom, and diagonal direction used in an image processing device according to a third embodiment of the present invention.

DETAILED DESCRIPTION OF THE INVENTION

Each embodiment of an image processing device according to the present invention will be hereinafter described with reference to the drawings.

[First Embodiment]

Figure 1:
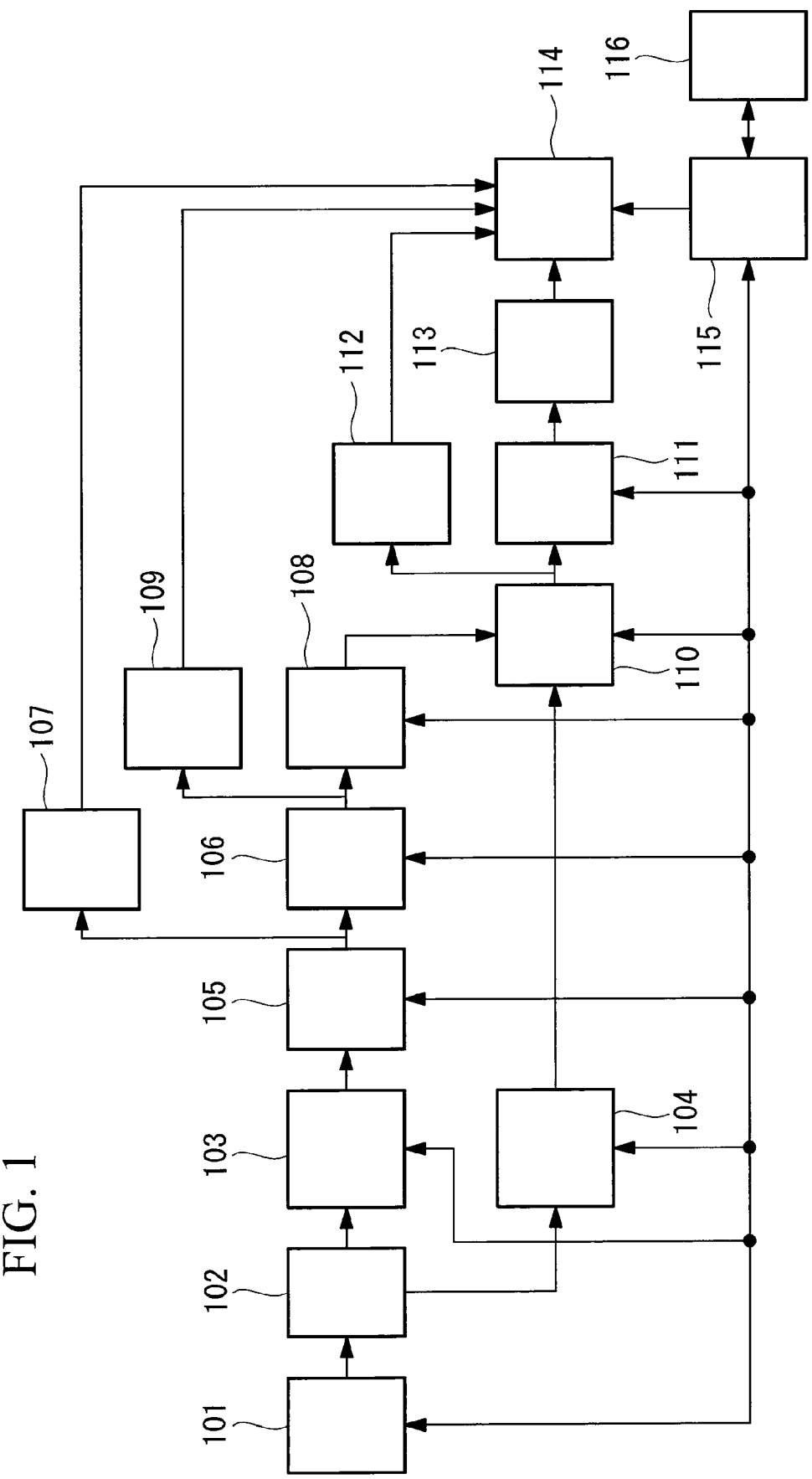
FIG. 1 is a diagram showing a configuration example of an image processing device according to a first embodiment of the present invention.

FIG. 1 is a block diagram showing one configuration example of an image processing device according to a first embodiment of the present invention. In FIG. 1, an input unit 101 is connected to a buffer 102. The buffer 102 is connected to a predominant color parameter calculation unit 103 and a sub-color parameter calculation unit 104. The predominant color parameter calculation unit 103 is connected to a predominant color isolated point determination unit 105. The predominant color isolated point determination unit 105 is connected to a predominant color isolated point correction unit 106 and a predominant color isolated point buffer 107. The predominant color isolated point correction unit 106 is connected to a predominant color edge detection unit 108 and a predominant color isolated point correction buffer 109. The predominant color isolated point buffer 107 is connected to an output unit 114. The predominant color isolated point correction buffer 109 is also connected to the output unit 114. The predominant color edge detection unit 108 is connected to a sub-color isolated point determination unit 110.

The sub-color parameter calculation unit 104 is connected to the sub-color isolated point determination unit 110. The sub-color isolated point determination unit 110 is connected to a sub-color isolated point correction unit 111 and a sub-color isolated point buffer 112. The sub-color isolated point correction unit 111 is connected to a sub-color isolated point correction buffer 113. The sub-color isolated point buffer 112 is connected to the output unit 114. The sub-color isolated point correction buffer 113 is also connected to the output unit 114.

A control unit 115 such as a microcomputer is bi-directionally connected with the input unit 101, the predominant color parameter calculation unit 103, the sub-color parameter calculation unit 104, the predominant color isolated point determination unit 105, the predominant color isolated point correction unit 106, the predominant color edge detection unit 108, the sub-color isolated point determination unit 110, the sub-color isolated point correction unit 111, and the output unit 114, where each of the units operates based on a control command from the control unit 115. The control unit 115 is connected to an external interface unit (hereinafter referred to as "external I/F unit") 116 for the user to turn ON/OFF the power supply and switch the threshold value setting.

The buffer 102 stores image signals input from the input unit 101. In the present embodiment, the image signals to be input are single-plate images of red (R), green (G), and blue (B) of a Bayer array, where green, whose appearance frequency is double that of red and blue, is defined as the predominant color, and red and blue are defined as the sub-colors.

The predominant color calculation unit 103 reads out a green image signal from the buffer 102, calculates a predominant color parameter value for every pixel based on the read green image signal, and outputs the predominant color parameter value to the predominant color isolated point determination unit 105.

For instance, the predominant color parameter calculation unit 103 calculates absolute values of the difference in pixel values of the pixel of interest and each of the neighboring pixels thereof, selects the absolute values by a number half the number of the neighboring pixels from smaller values of the absolute values, and calculates the predominant color parameter value by integrating the selected absolute values.

The method of calculating the predominant color parameter value will be specifically described below using FIG. 2. FIG. 2 is a view showing pixels of the Bayer array. First, the neighboring pixels of the same color as the pixel of interest are selected. A total of eight neighboring pixels are selected, the eight neighboring pixels being four pixels diagonally adjacent to the pixel of interest and four pixels on the left, right, top and bottom with one pixel in between from the pixel of interest. In FIG. 2, if the pixel of interest is G34, G14, G23, G25, G32, G36, G43, G45 and G54 are selected as the neighboring pixels.

Thereafter, an absolute value of a difference in pixel values of each of the selected neighboring pixels and the pixel of interest is calculated. The absolute values of the eight differences are thereby calculated. Among the absolute values of the eight differences, the absolute values of four differences, which correspond to half the total amount, are extracted from the smaller ones, and such extracted absolute values of four differences are integrated. The integrated value is the predominant color parameter value of the pixel of interest.

In the above calculation method, the method of selecting the neighboring pixels is arbitrary, and eight pixels on the left, right, top and bottom, and in the diagonal direction with one pixel in between from the pixel of interest may be selected as the neighboring pixels. In this case, if the pixel of interest is G34, G12, G14, G16, G32, G36, G52, G54 and G56 are selected as the neighboring pixels.

The method of calculating the predominant color parameter value is not limited to the above example. For instance, the predominant color parameter calculation unit 103 may calculate an average value of the neighboring pixels, and have the absolute value of the difference between the average value and the pixel of interest as the predominant color parameter value of the pixel of interest.

The predominant color isolated point determination unit 105 determines whether or not the pixel is an isolated point for each pixel of the green image signal. Specifically, the predominant color isolated point determination unit 105 compares the predominant color parameter value calculated by the predominant color parameter calculation unit 103 with a predetermined threshold value, and determines that the pixel of interest is the isolated point if the predominant color parameter value is greater than or equal to the predetermined threshold value, and determines that the pixel of interest is not the isolated point if the predominant color parameter value is smaller than the predetermined threshold value. The determination result is output to the predominant color isolated point correction unit 106 and the predominant color isolated point buffer 107 with the information of the pixel of interest.

The predominant color isolated point buffer 107 temporarily stores the determination result and the green image signal acquired by the predominant color isolated determination unit 105, and then outputs to the output unit 114.

The predominant color isolated point correction unit 106 performs the isolated point correction only on the pixel determined as the isolated point in the predominant color isolated point determination unit 105 of the green image signal, and outputs the green image signal after the process to the predominant color edge detection unit 108 and the predominant color isolated point buffer 109. Thus, the green image signal, in which the isolated point correction is performed only on the pixel determined as the isolated point and the isolated point correction is not performed on other pixels, is output to the predominant color edge detection unit 108 and the predominant color isolated point buffer 109.

The isolated point correction is performed using a median filter. For instance, the isolated point correction of the pixel of interest is performed by sorting the pixel values of a total of nine pixels, which are the pixel of interest and the eight neighboring pixels, and by replacing the pixel value of the pixel of interest with a median value of the sorted pixel values.

The predominant color isolated point correction buffer 109 temporarily stores the green image signal after the isolated point correction acquired by the predominant color isolated point correction unit 106, and then outputs to the output unit 114.

The predominant color edge detection unit 108 detects the edge from the green image signal after the isolated point correction, and outputs the information of the detected edge to the sub-color isolated point determination unit 110.

Specifically, the predominant color edge detection unit 108 uses a Laplacian filter of the diagonal direction shown in FIG. 3, and calculates the edge intensity at each pixel by applying the Laplacian filter to the predominant color signal.

The sub-color parameter calculation unit 104 reads out the red image signal and the blue image signal, which are sub-colors, from the buffer 102, calculates each sub-color parameter value from the read sub-color image signals for every pixel, and outputs the sub-color parameter value to the sub-color isolated point determination unit 110.

The calculation of the sub-color parameter value is similar to that by the predominant color parameter calculation unit 103, but the method of selecting the neighboring pixels is different since the pixel array of the sub-color is different from that of the predominant color. Specifically, in the case of the sub-color, the neighboring pixels are eight pixels on the left, right, top and bottom, and in the diagonal direction with one pixel in between from the pixel of interest. Using the red image signal by way of example, if the pixel of interest is R33, R11, R13, R15, R31, R35, R51, R53, R55 are selected as the neighboring pixels. The selection is similarly made for the blue image signal.

The sub-color isolated point determination unit 110 determines whether or not the pixel is an isolated point for each pixel of the red image signal and the blue image signal. Specifically, the sub-color isolated point determination unit 110 determines whether or not the pixel of interest is the isolated point based on the sub-color parameter value calculated by the sub-color parameter calculation unit 104, and the edge in the green image signal detected by the predominant color edge detection unit 108.

For instance, the sub-color isolated point determination unit 110 determines that the pixel of interest is the isolated point if the sub-color parameter value calculated by the sub-color parameter calculation unit 104 is greater than or equal to the predefined threshold value, and the absolute value of the edge intensity at two or more predominant color corresponding pixels detected by the predominant color edge detection unit 108 is smaller than or equal to the predefined threshold value. If R33 shown in FIG. 2 is the pixel of interest, the predominant color corresponding pixels are four pixels, G23, G32, G34 and G43, adjacent to the pixel of interest R33 on the left, right, top, and bottom. The determination result on whether or not the pixel is the isolated point and the information of the pixel of interest are output to the sub-color isolated point correction unit 111 and the sub-color isolated point buffer 112.

The sub-color isolated point buffer 112 temporarily stores the determination result and the sub-color image signal acquired by the sub-color isolated determination unit 110, and then outputs them to the output unit 114.

The sub-color isolated point correction unit 111 performs the isolated point correction on the pixel determined as the isolated point by the sub-color isolated point determination unit 110 for the red image signal and the blue image signal, and outputs the red image signal and the blue image signal after the process to the sub-color isolated point correction buffer 113. The isolated point correction method is similar to that of the predominant color isolated point correction unit 106. The sub-color isolated point correction buffer 113 outputs the signal after the sub-color isolated point correction acquired by the sub-color isolated point determination unit 110 to the output unit 114.

The output unit 114 synthesizes the predominant color signal after correction stored in the predominant color isolated point correction buffer 109 and the sub-color signal after correction stored in the sub-color isolated point correction buffer 113 to generate the color signal of the Bayer array and outputs the generated signal. For instance, the output unit 114 may output the signal to an interpolation processing unit (not illustrated), or may output the signal to an external storage device. The output unit 114 may output the information of the isolated point of the color signal stored in the predominant color isolated point buffer 107 and the information of the isolated point of the sub-color signal stored in the sub-color isolated point buffer 112 along with the color signal of the Bayer array. In this case, the output may be made to the isolated point correction processing unit (not illustrated).

The effects of the image processing device having the above-described configuration will be described below.

First, the image signal acquired by the imaging unit (not illustrated) is stored in the buffer 102 through the input unit 101. The predominant color parameter value is calculated for every pixel by the predominant color parameter calculation unit 103 for the green image signal, which is the predominant color, of the image signals stored in the buffer 102, and the determination of the isolated point based on the predominant color parameter value is made by the predominant color isolated point determination unit 105. The determination result and the information of each pixel from the predominant color isolated point determination unit 105 are output to the predominant color isolated point buffer 107 and the predominant color isolated point correction unit 106. The predominant color isolated point buffer 107 temporarily stores the determination result and the information of the pixels, and then outputs them to the output unit 114.

The predominant color isolated point correction unit 106 performs the isolated point correction only on the pixel determined as the isolated point by the predominant color isolated point determination unit 105. The green image signal after the isolated point correction process is output to the predominant color edge detection unit 108 and the predominant color isolated point correction buffer 109. The predominant color edge detection unit 108 detects the edge from the green image signal, and outputs the same to the sub-color isolated point determination unit 110. The green image signal after the isolated point correction output to the predominant color isolated point correction buffer 109 is temporarily stored, and then output to the output unit 114.

The sub-color parameter value is calculated for every pixel by the sub-color parameter calculation unit 104 for the red image signal and the blue image signal, which are the sub-colors, of the image signals stored in the buffer 102, and the sub-color parameter value is output to the sub-color isolated point determination unit 110. The sub-color isolated point determination unit 110 determines whether or not the isolated point based on the sub-color parameter value and the edge information of the predominant color detected by the predominant color edge detection unit 108, and outputs the determination result and the information of each pixel to the sub-color isolated point correction unit 111 and the sub-color isolated point buffer 112. The determination result of the sub-color of the sub-color isolated point determination unit 110 and the pixel information output to the sub-color isolated point buffer 112 are temporarily stored, and then output to the output unit 114.

The sub-color isolated point correction unit 111 performs the isolated point correction only on the pixel determined as the isolated point by the sub-color isolated point determination unit 110. The sub-color signal after the isolated point correction is temporarily stored in the sub-color isolated point correction buffer 113, and then output to the output unit 114.

In the output unit 114, the green image signal as well as the red image signal and the blue image signal performed with the isolated point correction are synthesized to generate the image signal of the Bayer array after the isolated point correction.

In the present embodiment, the processes by hardware are premised on in the image processing device, but such a configuration is not the sole case. For instance, a configuration of separately processing in software may be adopted. In this case, the image processing device includes a main storage device such as a CPU and a RAM, and a computer readable recording medium recorded with a program for implementing all or a part of the above processes. The CPU reads out the program stored in the storage medium and executes the processing and calculation process of the information to implement the processes similar to the image processing device.

The computer readable recording medium includes a magnetic disc, a magnetic optical disc, a CD-ROM, a DVD-ROM, a semiconductor memory, and the like. The computer program may be distributed to the computer by a communication line, and the computer receiving the distribution may execute the relevant program.

Figure 4:
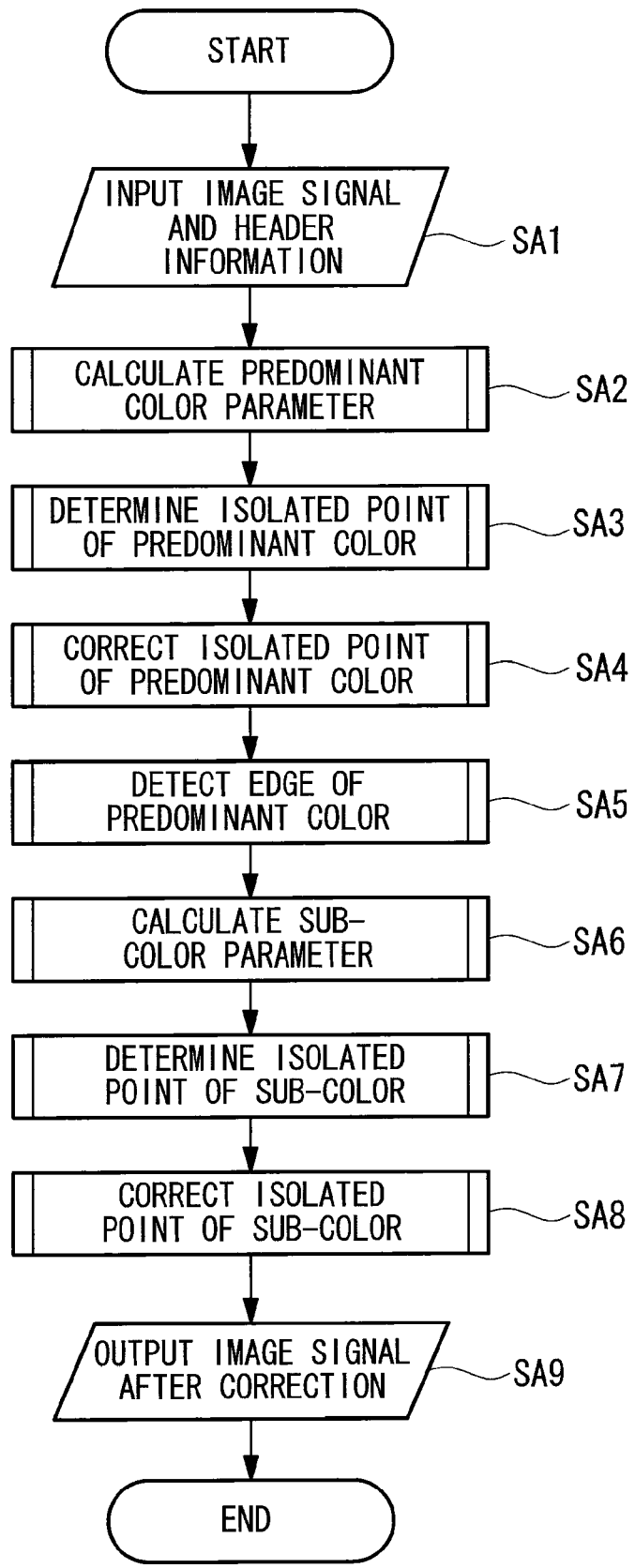
FIG. 4 is a view showing an operation flow of the image processing device according to the first embodiment of the present invention.

The processing procedures of the image processing method implemented when the CPU executes the image processing program will be hereinafter described with reference to FIG. 4. FIG. 4 is a view showing an operation flow related to the image signal process implemented by the image processing device described above.

In step SA1, the input image signal and the header information are acquired. In step SA2, the predominant color parameter value of the predominant color signal, which is the color signal with the highest appearance frequency, is calculated from the acquired image signal. In step SA3, whether or not the pixel of interest is the isolated point is determined using the predominant color parameter value calculated in step SA2. In step SA4, the isolated point correction is performed on the pixel of the predominant color determined as the isolated point in step SA3. In step SA5, the edge of the predominant color signal is detected. In step SA6, the sub-color parameter value of the sub-color signal is calculated.

In step SA7, whether or not the pixel of interest is the isolated point is determined using the sub-color parameter value calculated in step SA6 and the edge information detected in step SA5. In step SA8, the isolated point correction is performed on the pixel of the sub-color determined as the isolated point in step SA7. In step SA9, the predominant color signal and the sub-color signal after the isolated point correction are synthesized and then output, and the present process is terminated.

Figure 5:
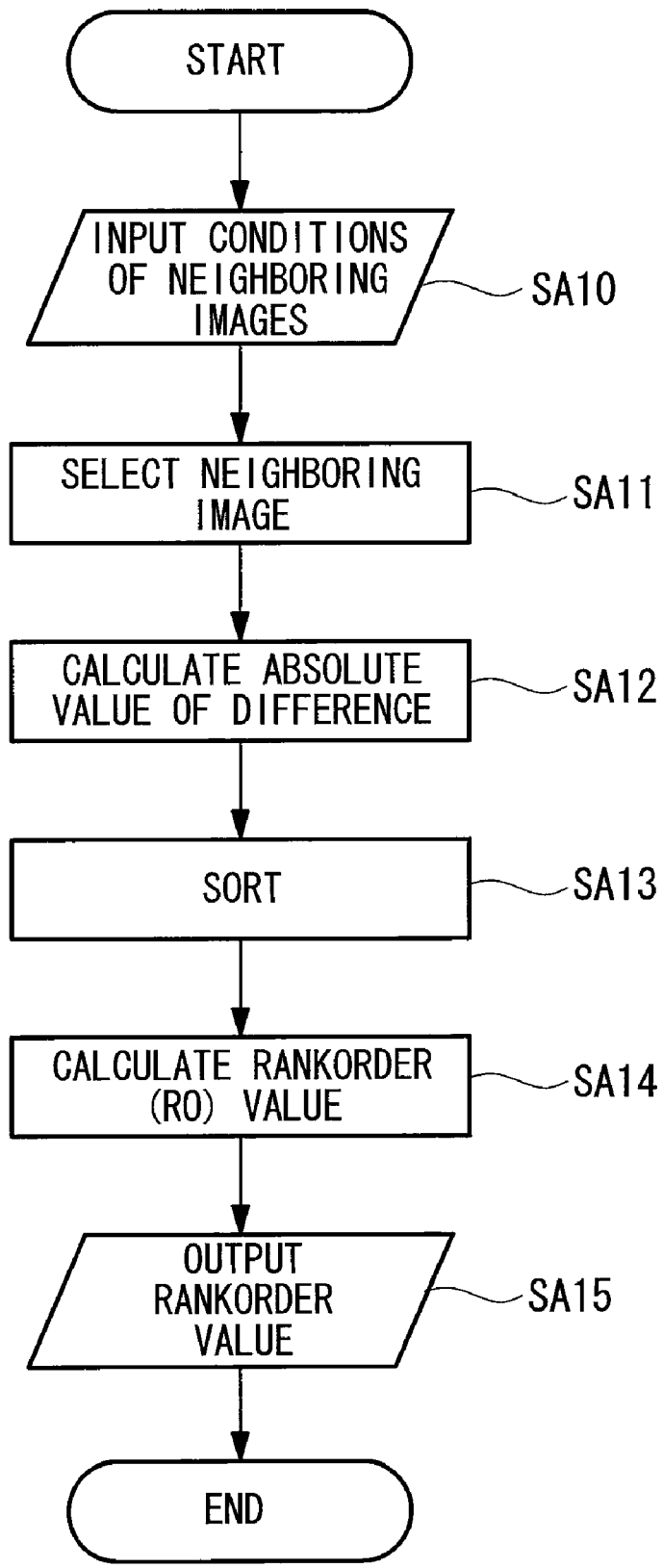
FIG. 5 is a view showing an operation flow of the predominant color parameter calculation process of FIG. 4.

FIG. 5 is a view showing an operation flow related to the predominant color parameter calculation process in step SA2 of FIG. 4. In step SA10, the conditions for setting the neighboring pixels of the pixel of interest are acquired. In step SA11, the neighboring pixels of the pixel of interest are selected according to the set conditions of the neighboring pixels of the pixel of interest acquired in step SA10. In step SA12, the absolute value of the difference in pixel values of the pixel of interest and each of the neighboring pixels selected in step SA11 is calculated. In step SA13, the absolute values of the differences calculated in step SA12 are sorted in ascending order.

In step SA14, the absolute values are extracted from the absolute values sorted in step SA13 by a number half the entire number in ascending order, and the extracted absolute values are integrated. The integrated value is assumed as a RO (Rank Order) value. In step SA15, the RO value calculated in step SA14 is output as the predominant color parameter, and the present process is terminated.

Figure 6:
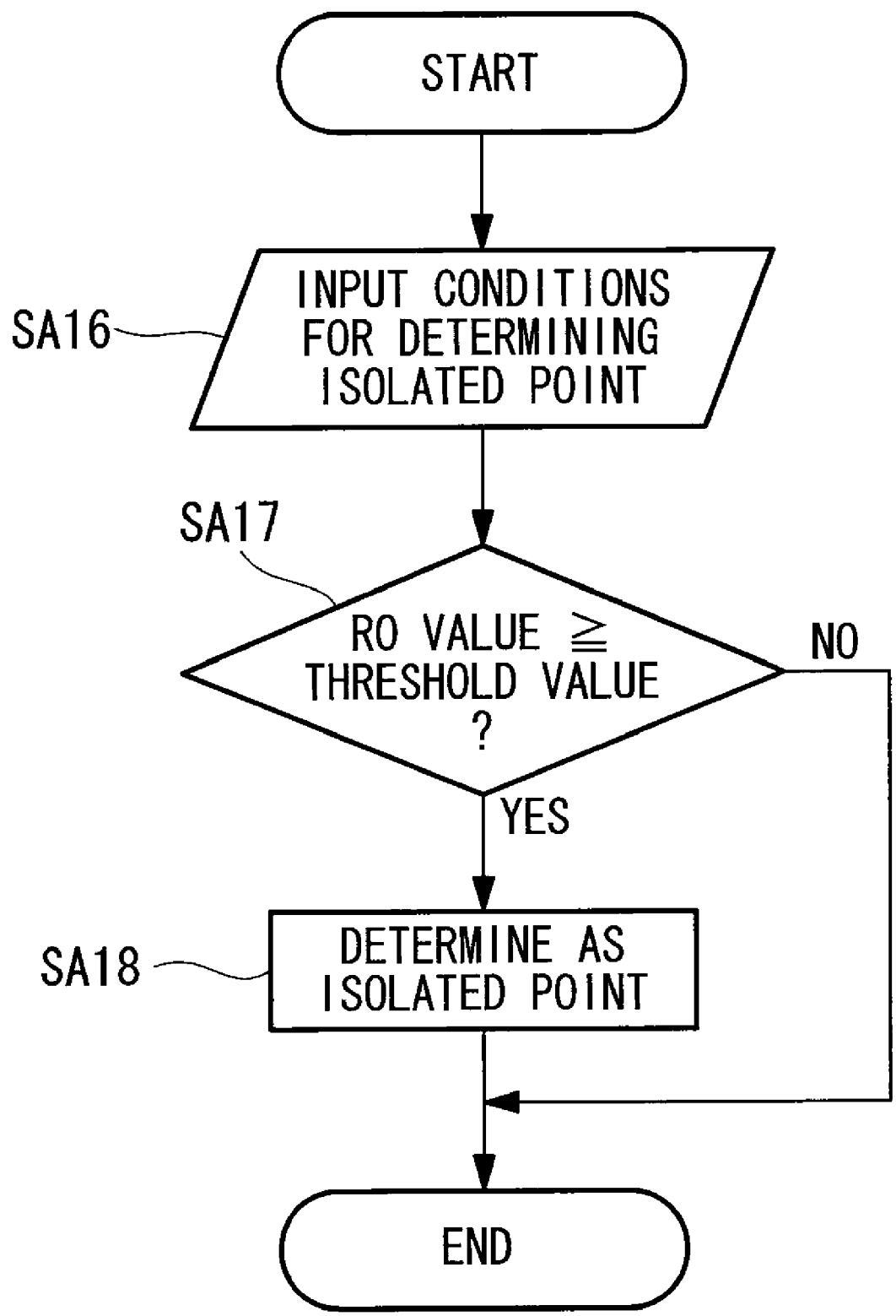
FIG. 6 is a view showing an operation flow of the predominant color isolated point determination process of FIG. 4.

FIG. 6 is a view showing an operation flow related to the predominant color isolated point determination process in step SA3 of FIG. 4. In step SA16, the conditions such as the threshold value for determining whether or not the isolated point are acquired. In step SA17, whether or not the predominant color parameter value is greater than or equal to a predetermined threshold value is compared, where the process proceeds to step SA18 if the predominant color parameter value is greater than or equal to the predetermined threshold value, and terminates the present process if determined that the pixel of interest is an isolated point. The present process is also terminated if the predominant color parameter value is smaller than the predetermined threshold value.

Figure 7:
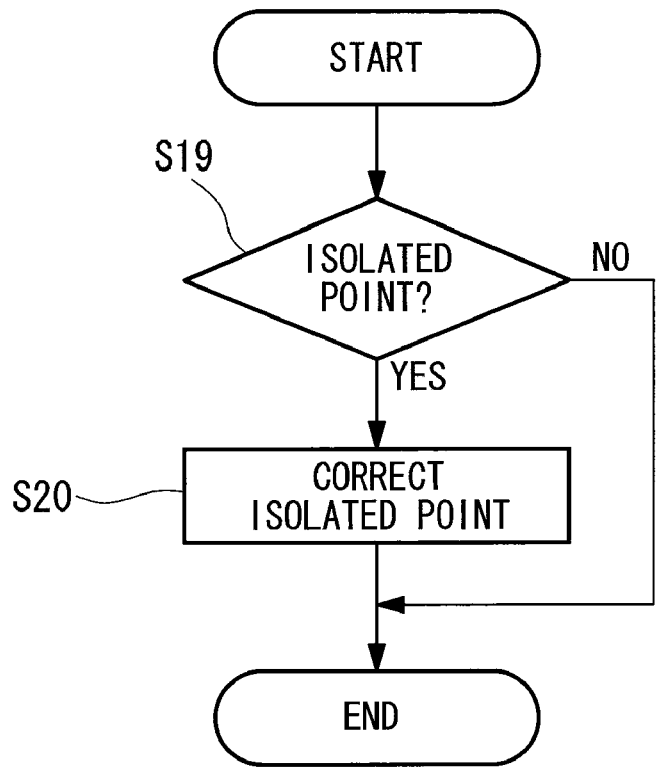
FIG. 7 is a view showing an operation flow of the predominant color isolated point correction process of FIG. 4.

FIG. 7 is a view showing an operation flow related to the predominant color isolated point correction process in step SA4 of FIG. 4. The processing result by the isolated point determination process is referenced in step SA19, where the process proceeds to step SA20 if the pixel of interest is an isolated point, the signal value of the pixel of interest is corrected using the median filter, and the present process is terminated. If the pixel of interest is not the isolated point in step SA19, the present process is terminated without performing the correction.

Figure 8:
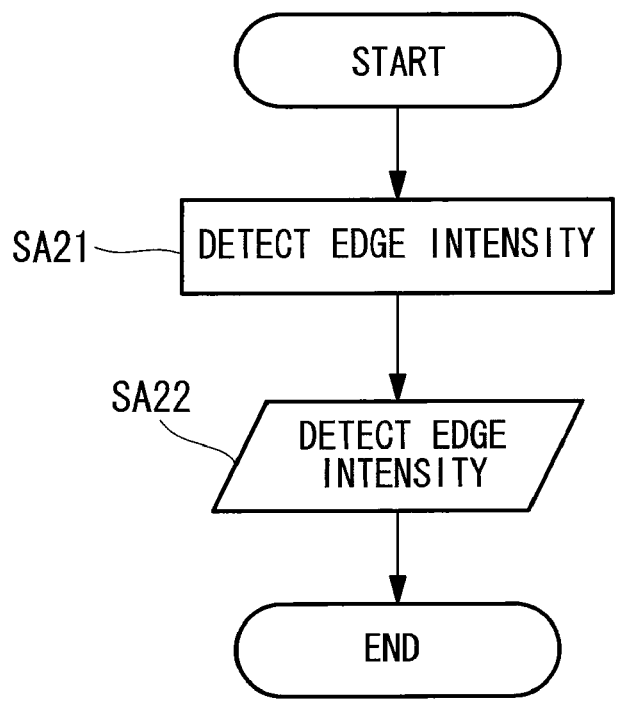
FIG. 8 is a view showing an operation flow of the predominant color edge detection process of FIG. 4.

FIG. 8 is a view showing an operation flow related to the predominant color edge detection process in step SA5 of FIG. 4. In step SA21, the edge intensity of the predominant color signal is calculated using the Laplacian filter. In step SA22, the edge intensity calculated in step SA21 is output, and the present process is terminated.

Figure 9:
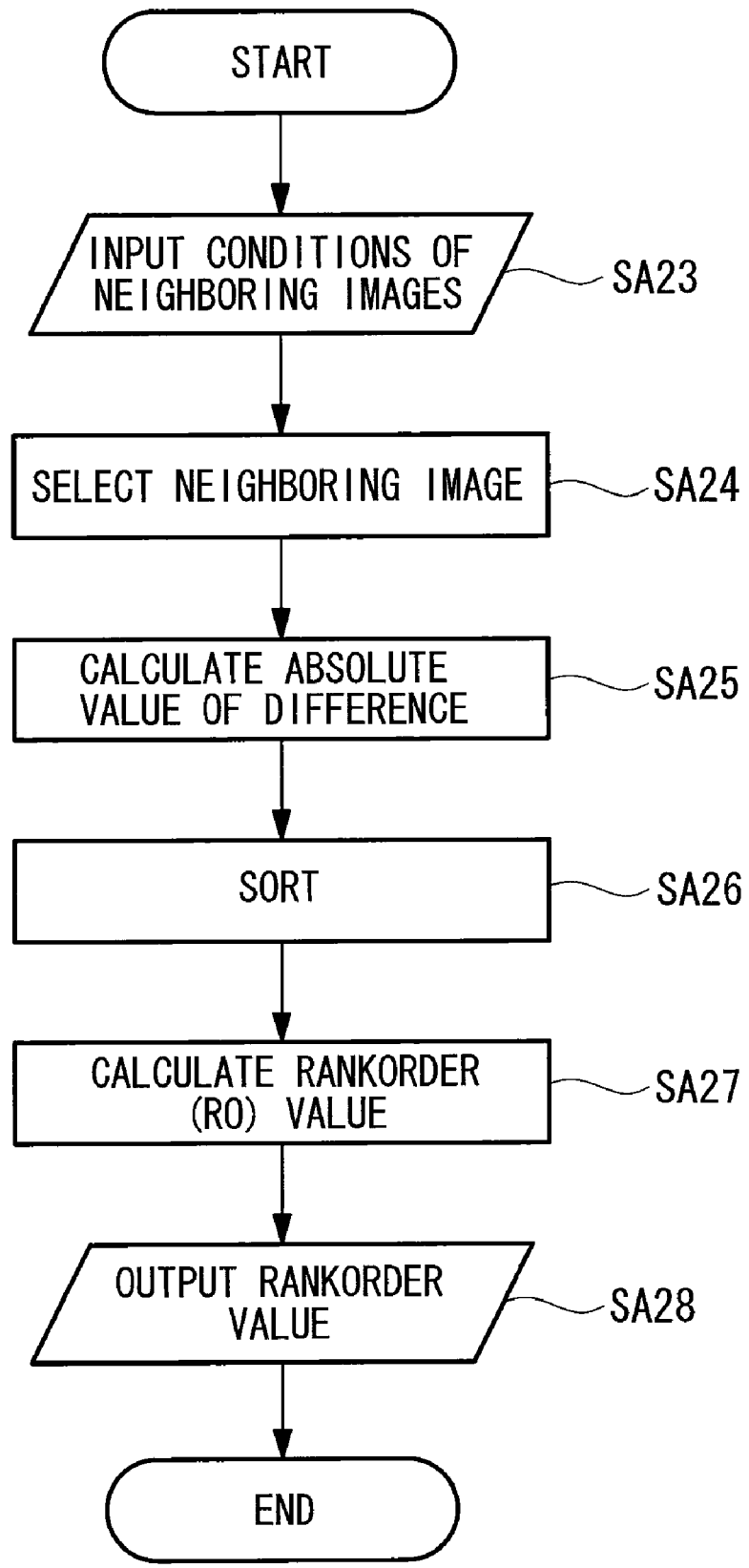
FIG. 9 is a view showing an operation flow of the sub-color parameter calculation process of FIG. 4.

FIG. 9 is an operation flow related to the sub-color parameter calculation process in step SA6 of FIG. 4. In step SA23, the conditions for setting the neighboring pixels of the pixel of interest are input. In step SA24, the neighboring pixels of the pixel of interest are selected according to the conditions for setting the neighboring pixels of the pixel of interest input in step SA23. In step SA25, the absolute values of the difference between the pixel of interest and the neighboring pixels of the pixel of interest selected in step SA24 are calculated. In step SA26, the absolute values calculated in step SA25 are sorted in ascending order. In step SA27, the absolute values by a number half the entire number are integrated from the smaller ones of the absolute values sorted in step SA26, and the integrated value is assumed as the RO (Rank Order) value. In step SA28, the RO value calculated in step SA27 is output as the sub-color parameter value, and the present process is terminated.

Figure 10:
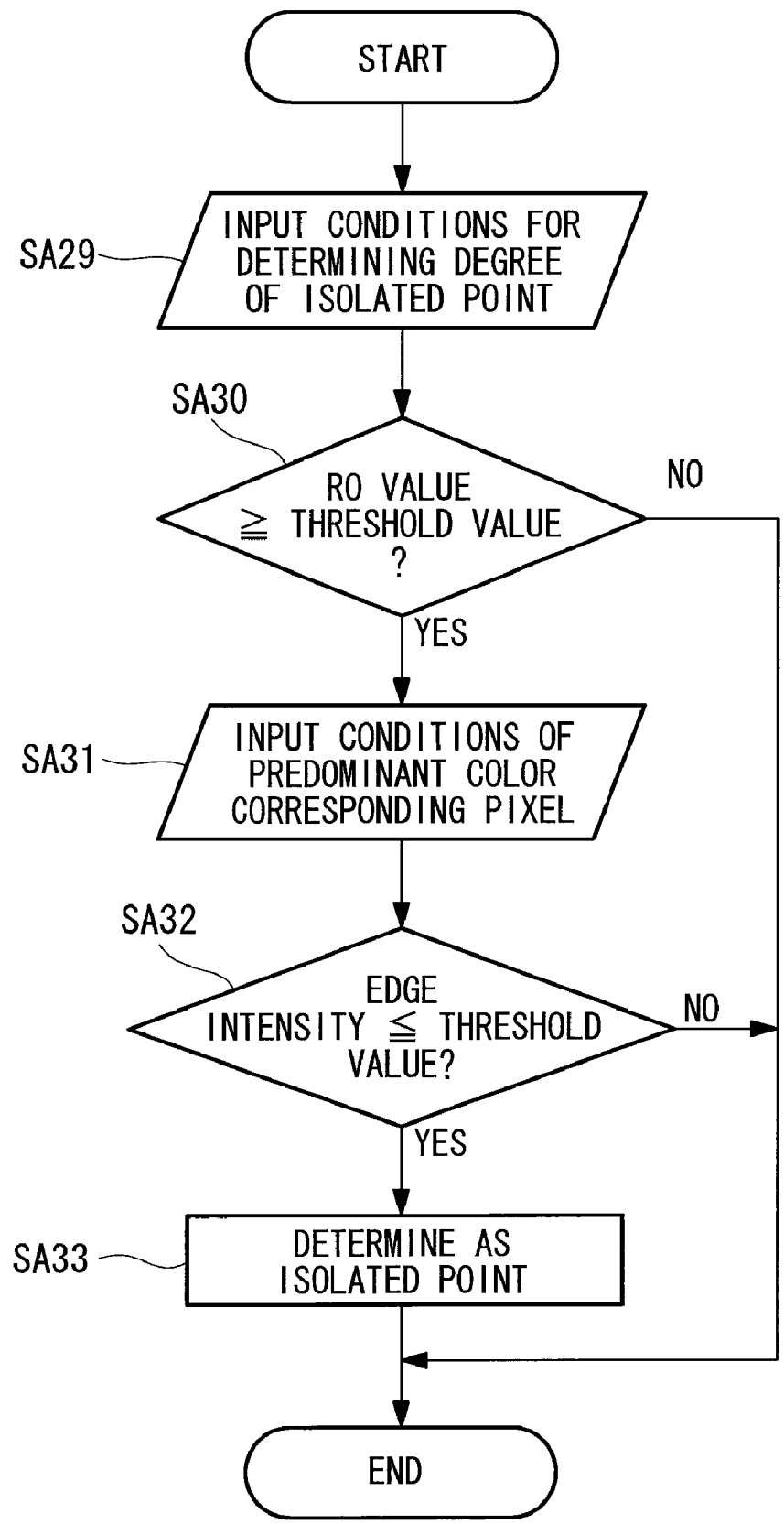
FIG. 10 is a view showing an operation flow of the sub-color isolated point determination process of FIG. 4.

FIG. 10 is an operation flow related to the sub-color isolated point determination process in step SA7 of FIG. 4. In step SA29, the conditions such as the threshold value for determining whether or not the pixel of interest of the sub-color is an isolated point are acquired. In step SA30, whether or not the RO value is greater than or equal to a predetermined threshold value is compared, where the process proceeds to step SA31 if the RO value is greater than or equal to the predetermined threshold value. In step SA31, the conditions for setting the predominant color corresponding pixel of the pixel of interest of the sub-color are input.

In step SA32, whether or not the edge intensity of the predominant color corresponding pixel is smaller than or equal to the predetermined threshold value is compared, where the process proceeds to step SA33 if the edge intensity is smaller than or equal to the predetermined threshold value. In step SA33, whether or not the pixel of interest of the sub-color is an isolated point is determined, and the present process is terminated. If the RO value is smaller than the predetermined threshold value in step SA30, and if the edge intensity of the predominant color corresponding pixel is greater than the predetermined threshold value in step SA32, the present process is terminated as is.

Figure 11:
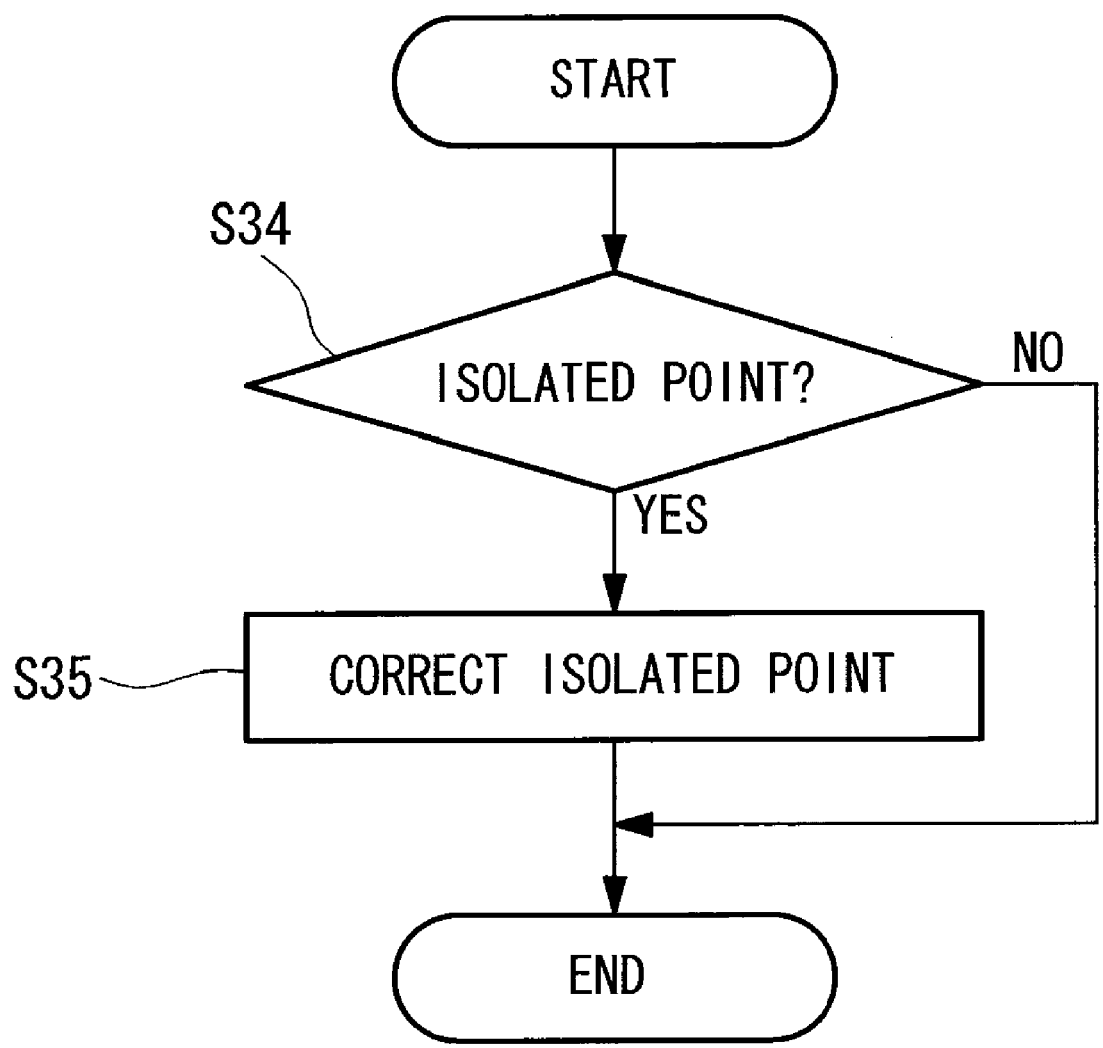
FIG. 11 is a view showing an operation flow of the sub-color isolated point correction process of FIG. 4.

FIG. 11 is an operation flowchart related to the sub-color isolated point correction process in step SA8 of FIG. 4. In step SA34, whether or not the pixel of interest is the isolated point is determined, and the process proceeds to step SA35 if the pixel of interest is the isolated point, the signal value of the pixel of interest is corrected using the median filter, and the present process is terminated. If not the isolated point in step SA34, the present process is terminated as is.

As described above, in accordance with the image processing device, the image processing method, and the image processing program according to the present embodiment, the isolated point correction of the sub-color signal is performed using the edge information of the predominant color after the isolated point correction of the predominant color signal from the input image signal. The isolated point correction based on more detailed image information can be thus performed on the sub-color signal in which the determination of the defective pixel is difficult, whereby the accuracy of the isolated point correction can be enhanced.

The input signal is a single plate RGB in the present embodiment, but is not limited thereto, and may be other signals. The signal of luminance, color difference, and the like may be used.

The median filter is used when performing the correction in the present embodiment, but is not limited thereto, and other correction methods may be used. For instance, correction may be made on the average value of the neighboring pixels.

In the present embodiment, the edge is detected using the Laplacian filter, but this is not the sole case, and other edge detection methods may be used.

[Second Embodiment]

The image signal processing device according to a second embodiment of the present invention will be described below with reference to the drawings.

The isolated point correction is performed only on the pixel determined as the isolated point in the first embodiment, but in the present embodiment, the degree of isolated point is calculated, and the correction of the pixel of interest is performed by mixing the pixel value of the pixel of interest and the pixel values of the neighboring pixels through weighting according to the degree of isolated point. In regards to the image processing device according to the present embodiment, description on aspects common with the first embodiment will be omitted, and the differing aspects will be mainly described.

Figure 12:
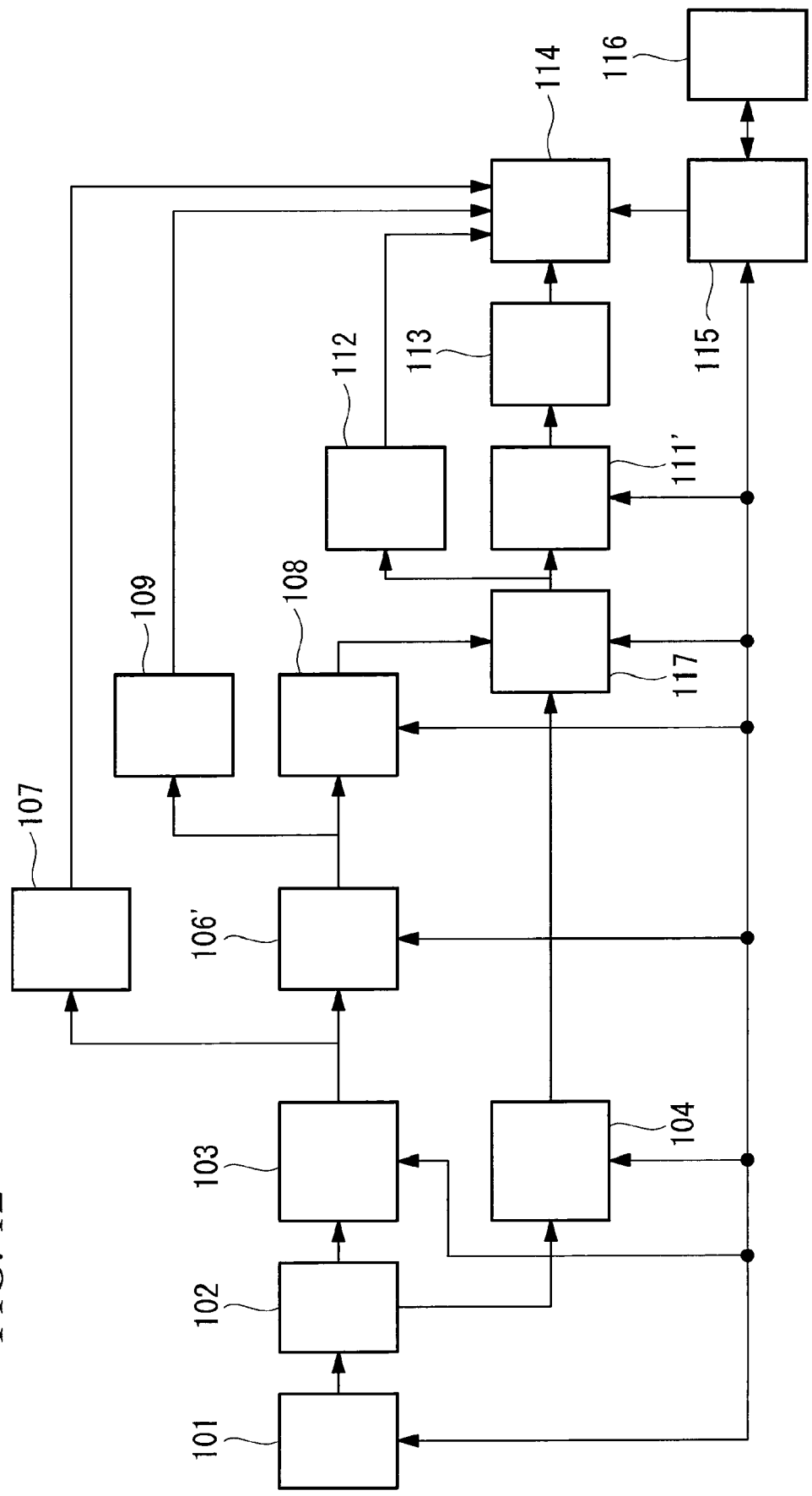
FIG. 12 is a diagram showing a configuration example of an image processing device according to a second embodiment of the present invention.

FIG. 12 is a block diagram showing one configuration example of the image processing device according to the second embodiment of the present invention. As shown in FIG. 12, in the image processing device according to the present embodiment, the predominant color isolated point determination unit 105 (see FIG. 1) according to the first embodiment is omitted, and a sub-color isolated point degree calculation unit 117 is arranged in place of the sub-color isolated point determination unit 110 (see FIG. 1). Furthermore, the correction processes in the predominant color isolated point correction unit 106' and the sub-color isolated point correction unit 111' are different from each other.

The predominant color isolated point correction unit 106' performs the isolated point correction according to the predominant color parameter value calculated by the predominant color parameter calculation unit 103. Specifically, a median filter according to the predominant color parameter value is created, and the isolated point is corrected using such a median filter.

The sub-color isolated point degree calculation unit 117 calculates the sub-color parameter value indicating the isolated point degree for each pixel of the red image signal and the blue image signal. Specifically, the sub-color isolated point degree calculation unit 117 obtains a product of the sub-color parameter value calculated by the sub-color parameter calculation unit 104 and the edge intensity in the green image signal detected by the predominant color edge detection unit 108, and outputs the same to the sub-color isolated point correction unit 111' and the sub-color isolated point buffer 112 as the isolated point degree. It is to be recognized that the isolated point degree is a parameter value that determines the intensity (effect) of the isolated point correction and does not determine whether or not the isolated point.

The sub-color isolated point correction unit 111' corrects the isolated point by mixing the pixel value of the pixel of interest of the sub-color and the pixel values of the neighboring pixels through weighting according to the isolated point degree of the sub-color calculated by the sub-color isolated point degree calculation unit 117. Specifically, the median filter is used for a total of nine pixels, the pixel of interest and the eight neighboring pixels, to blend the median value and the signal value of the pixel of interest according to the degree of isolated point. The values are blended with the weight of the median value heavier the higher the degree of isolated point, and the weight of the signal value of the pixel of interest heavier the smaller the degree of isolated point.

As described above, in accordance with the image processing device, the image processing method, and the image processing program according to the present embodiment, the isolated point degree of the sub-color signal is calculated using the edge information of the predominant color after the isolated point correction of the predominant color signal from the input image signal, and the correction according to such a degree is performed. The isolated point correction based on more detailed image information can be thus performed on the sub-color signal in which the determination of the defective pixel is difficult, whereby the accuracy of the isolated point correction can be enhanced.

[Third Embodiment]

The image signal processing device according to a third embodiment of the present invention will be described below with reference to the drawings.

The input image signal uses a single plate image of red (R), green (G), and blue (B) of the Bayer array in the first embodiment, but in the present embodiment, the input image signal uses a two-plate pixel array in which green (G) of the pixel array occurs in all pixels and red (R) and blue (B) occur alternately. The description on the aspects common with the first embodiment will be omitted, and the differing aspects will be mainly described.

The flow of the signal in FIG. 1 is similar to the first embodiment, but the image signal input from the input unit 101 has a two-plate pixel array, and thus green (G) occurs in all pixels, and red (R) and blue (B) occur alternately. Thus, the appearance frequency of green is double that of red and blue.

The method of calculating the predominant color parameter value in the predominant color parameter calculation unit 103 is similar to the first embodiment, and thus the description thereof will be omitted, but the neighboring pixels of the same color as the pixel of interest to be selected differ. In the present embodiment, the pixel is selected using the two-plate pixel array shown in FIG. 13.

First, the neighboring pixels of the same color as the pixel of interest are selected. The predominant color signal is a green (G) signal. In FIG. 13, the pixel of interest is G33. The eight neighboring pixels adjacent to the pixel of interest on the left, right, top and bottom, and in the diagonal direction are selected. In FIG. 13, G22, G23, G24, G32, G34, G42, G43 and G44 are selected.

The method of calculating the sub-color parameter value in the sub-color parameter calculation unit 104 is similar to the first embodiment, and thus the description thereof will be omitted, but the neighboring pixels of the same color as the pixel of interest to be selected differ. In the present embodiment, the pixels are selected using the two-plate pixel array shown in FIG. 14.

First, the neighboring pixels of the same color as the pixel of interest are selected. In FIG. 14, the pixel of interest is R33. The eight neighboring pixels on the left, right, top and bottom, and in the diagonal direction with one pixel in between from the pixel of interest are selected. In FIG. 14, R11, R13, R15, R31, R35, R51, R53 and R55 are the neighboring pixels.

The predominant color edge detection unit 108 detects the edge from the green image signal after the isolated point correction, and outputs the information of the detected edge to the sub-color isolated point determination unit 110.

Specifically, the predominant color edge detection unit 108 uses a Laplacian filter of the diagonal direction shown in FIG. 15, and calculates the edge intensity at each pixel by applying the Laplacian filter to the predominant color signal.

The output unit 114 synthesizes the predominant color signal after correction stored in the predominant color isolated point correction buffer 109, and the sub-color signal after correction stored in the sub-color isolated point correction buffer 113 to generate a two-plate color signal, and outputs the generated signal. For instance, the output unit 114 may output the generated signal to an interpolation processing unit (not shown) or to an external storage device. The output unit 114 may output the information of the isolated point of the predominant color signal stored in the predominant color isolated point buffer 107 and the information of the isolated point of the sub-color signal stored in the sub-color isolated point buffer 112 along with the two-plate color signal. In this case, the output may be made to an isolated point correction processing unit (not illustrated).

In the present description, the input signal is a two-plate type where the predominant color signal is the green signal and the sub-color signals are the red image signal and the blue image signal, but not limited thereto, and may be other signals. For instance, the input signal may be other signals where the predominant color signal is a luminance signal, and the sub-color signal is a color difference signal.

As described above, in the present embodiment, the isolated point can be corrected similar to the first embodiment even if the pixel array differs from that of the first embodiment. The third embodiment may be applied to the second embodiment.

The embodiments of the present invention have been described in detail with reference to the drawings, but the specific configuration is not limited to such embodiments, and design changes and the like may be made within a scope not deviating from the gist of the invention.

What is claimed is:

1. An image processing device comprising:
   an edge detection unit for detecting an edge using an input image signal consisting of a plurality of color signals including a color signal having a different appearance frequency from another color signal, or a predominant color signal, which is a color signal with a highest appearance frequency, contained in the input image signal;
   a sub-color parameter calculation unit for calculating, with respect to a sub-color signal which is a color signal other than the predominant color signal in the plurality of color signals, from a pixel of interest and neighboring pixels of a same color as the pixel of interest, a sub-color parameter value related to a degree of isolated point of the pixel of interest; and
   a sub-color isolated point correction unit for correcting the pixel of interest based on the sub-color parameter value calculated by the sub-color parameter calculation unit and information of the edge detected by the edge detection unit.

2. The image processing device according to claim 1, further comprising:
   a sub-color isolated point determination unit for determining whether or not the pixel of interest is an isolated point using the sub-color parameter value calculated by the sub-color parameter calculation unit and the information of the edge detected by the edge detection unit;
   wherein the sub-color isolated point correction unit corrects the pixel of interest determined as the isolated point by the sub-color isolated point determination unit.

3. The image processing device according to claim 2, wherein the sub-color isolated point determination unit determines the pixel of interest as the isolated point when the sub-color parameter value calculated by the sub-color parameter calculation unit is greater than or equal to a predetermined threshold value and an intensity of the edge detected by the edge detection unit is smaller than or equal to a predetermined threshold value.

4. The image processing device according to claim 1, wherein the sub-color isolated point correction unit creates a median filter according to the sub-color parameter value calculated by the sub-color parameter calculation unit, and corrects the pixel of interest using the created median filter.

5. The image processing device according to claim 1, further comprising:
   a sub-color isolated point degree calculation unit for calculating the degree of isolated point of the pixel of interest using the sub-color parameter value calculated by the sub-color parameter calculation unit and the information of the edge detected by the edge detection unit;
   wherein the sub-color isolated point correction unit corrects the pixel of interest according to the degree of isolated point calculated by the sub-color isolated point degree calculation unit.

6. The image processing device according to claim 5, wherein the sub-color isolated point degree calculation unit calculates a product of the sub-color parameter value calculated by the sub-color parameter calculation unit and an intensity of the edge detected by the edge detection unit as the degree of isolated point.

7. The image processing device according to claim 5, wherein the sub-color isolated point correction unit corrects the pixel of interest by mixing a pixel value of the pixel of interest and a pixel value of a neighboring pixel through weighting according to the degree of isolated point calculated by the sub-color isolated point degree calculation unit.

8. The image processing device according to claim 1, wherein the sub-color parameter calculation unit:
   calculates an absolute value of a difference between a pixel value of the pixel of interest and pixel values of each of the neighboring pixels;
   selects half of the calculated absolute values from among smaller values of the calculated absolute values; and
   calculates the sub-color parameter value by integrating the selected absolute values.

9. The image processing device according to claim 1, wherein the sub-color parameter calculation unit calculates a difference between the pixel value of the pixel of interest and an average pixel value of the neighboring pixels as the sub-color parameter value.

10. The image processing device according to claim 1, further comprising:
    a predominant color parameter calculation unit for calculating a predominant color parameter value related to the degree of isolated point of the pixel of interest from the pixel of interest and the neighboring pixels of the same color as the pixel of interest with respect to the predominant color signal; and
    a predominant color isolated point correction unit for correcting the pixel of interest according to the predominant color parameter value calculated by the predominant color parameter calculation unit.

11. The image processing device according to claim 10, wherein the edge detection unit detects the edge using the predominant color signal corrected by the predominant color isolated point correction unit.

12. The image processing device according to claim 10, wherein the predominant color parameter calculation unit:
    calculates an absolute value of a difference between a pixel value of the pixel of interest and pixel values of each of the neighboring pixels;
    selects half of the calculated absolute values from among smaller values of the calculated absolute values; and
    calculates the predominant color parameter value by integrating the selected absolute values.

13. The image processing device according to claim 10, wherein the predominant color parameter calculation unit calculates a difference between the pixel value of the pixel of interest and an average pixel value of the neighboring pixels as the predominant color parameter value.

14. An imaging system comprising:
    an imaging unit which acquires an image signal; and
    the image processing device according to claim 1 for performing image processing on the image signal acquired by the imaging unit as the input image signal.

15. An image processing method comprising:
    detecting an edge using an input image signal consisting of a plurality of color signals including a color signal having a different appearance frequency from another color signal, or a predominant color signal, which is a color signal with a highest appearance frequency, contained in the input image signal;
    calculating, with respect to a sub-color signal which is a color signal other than the predominant color signal in the plurality of color signals, from a pixel of interest and neighboring pixels of a same color as the pixel of interest, a sub-color parameter value related to a degree of isolated point of the pixel of interest; and
    correcting the pixel of interest based on the calculated sub-color parameter value and information of the detected edge.

16. A non-transitory computer readable recording medium having an image processing program recorded thereon which controls a computer to execute functions comprising:
    detecting an edge using an input image signal consisting of a plurality of color signals including a color signal having a different appearance frequency from another color signal, or a predominant color signal, which is a color signal with a highest appearance frequency, contained in the input image signal;
    calculating, with respect to a sub-color signal which is a color signal other than the predominant color signal in the plurality of color signals, from a pixel of interest and neighboring pixels of a same color as the pixel of interest, a sub-color parameter value related to a degree of isolated point of the pixel of interest; and
    correcting the pixel of interest based on the calculated sub-color parameter value and information of the detected edge.

* * * * *